(12) United States Patent
Basak et al.

(10) Patent No.: US 11,347,709 B2
(45) Date of Patent: May 31, 2022

(54) HIERARCHICAL METADATA ENHANCEMENTS FOR A MEMORY MANAGEMENT SYSTEM

(71) Applicant: SAP SE, Walldorf (DE)

(72) Inventors: Nirvik Basak, Pune (IN); Souvik Pal, West Bengal (IN); Chaitanya Gottipati, Pune (IN); Amit Saonerkar, Nagpur (IN); Prasanta Ghosh, San Ramon, CA (US); Mihnea Andrei, Issy-les-Moulineaux (FR); Norman May, Karlsruhe (DE)

(73) Assignee: SAP SE, Walldorf (DE)

( * ) Notice: Subject to any disclaimer, the term of this patent is extended or adjusted under 35 U.S.C. 154(b) by 23 days.

(21) Appl. No.: 16/878,870

(22) Filed: May 20, 2020

(65) Prior Publication Data

US 2021/0311922 A1 Oct. 7, 2021

(30) Foreign Application Priority Data

Apr. 1, 2020 (IN) .............................. 202011014599

(51) Int. Cl.
*G06F 16/22* (2019.01)
*G06F 16/245* (2019.01)

(52) U.S. Cl.
CPC ........ *G06F 16/2282* (2019.01); *G06F 16/245* (2019.01)

(58) Field of Classification Search
CPC ... G06F 16/2282; G06F 16/245; G06F 16/278
See application file for complete search history.

(56) References Cited

U.S. PATENT DOCUMENTS

| 2009/0210445 | A1* | 8/2009 | Draese ................. G06F 16/221 |
| 2013/0227236 | A1 | 8/2013 | Flynn et al. |
| 2014/0279941 | A1 | 9/2014 | Atkisson |
| 2015/0058522 | A1 | 2/2015 | Armstrong et al. |
| 2015/0363456 | A1 | 12/2015 | Raman et al. |
| 2016/0147861 | A1 | 5/2016 | Schreter et al. |
| 2017/0017674 | A1* | 1/2017 | Scheuer ............. G06F 16/2282 |
| 2017/0039232 | A1* | 2/2017 | Jayanth ................ G06F 16/278 |
| 2017/0147618 | A1 | 5/2017 | Geissinger et al. |
| 2017/0344593 | A1* | 11/2017 | Mullick ............. G06F 11/1451 |
| 2018/0336229 | A1 | 11/2018 | Muehle et al. |
| 2019/0129999 | A1 | 5/2019 | Baggett et al. |
| 2020/0364193 | A1* | 11/2020 | Zhou .................. G06F 11/3414 |

(Continued)

*Primary Examiner* — James E Richardson
(74) *Attorney, Agent, or Firm* — Sterne, Kessler, Goldstein & Fox P.L.L.C.

(57) ABSTRACT

System, method, and various embodiments for providing a metadata based memory management system are described herein. An embodiment operates by determining metadata of a table of a database indicating whether data of the table is to be stored in memory or disk storage, wherein the table comprises a plurality of columns and a plurality of rows. A first column of the table is identified. A hierarchy of the metadata for the table including a column value, partition value, and table value is determined, wherein the column value is prioritized over the partition value, and wherein the partition value is prioritized over the table value. The data of the table stored in the column is loaded from the disk storage into the memory based on the hierarchy. A query is processed based on the data loaded into the memory.

20 Claims, 5 Drawing Sheets

(56) References Cited

U.S. PATENT DOCUMENTS

| | | |
|---|---|---|
| 2020/0403633 A1 | 12/2020 | Lasch et al. |
| 2021/0089552 A1 | 3/2021 | Karl et al. |
| 2021/0256063 A1 | 8/2021 | Kasperovics et al. |
| 2021/0311949 A1 | 10/2021 | Basak et al. |

* cited by examiner

HIERARCHICAL METADATA ENHANCEMENTS FOR A MEMORY MANAGEMENT SYSTEM

CROSS-REFERENCE TO RELATED APPLICATION

This application claims priority to is related to Indian Patent Application No. 202011014599, titled "Hierarchical Metadata Enhancements For A Memory Management System" to Basak et al., filed Apr. 1, 2020, which is herein incorporated by reference in its entirety.

This application is related to U.S. patent application Ser. No. 16/878,887, titled "Metadata Converter and Memory Management System" to Basak et al., filed herewith, which is herein incorporated by reference in its entirety.

BACKGROUND

When a query on a database is received, for the query to be processed, the data that needs to be searched based on the query first needs to be loaded into memory. In a column-oriented database, a query on a particular column of data may only require a small subsection of data to be searched or accessed relative to the large amount of data available in the column. In such situations, it is a waste of system resources to load all of the column data into memory, when only a small portion of the data is required for processing the query.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing hierarchical metadata enhancements for a memory management system.

When a query on a database is received, for the query to be processed, the data that needs to be searched based on the query first needs to be loaded into memory. In a column-oriented database, a query on a particular column of data may only require a small subsection of data to be searched or accessed relative to the large amount of data available in the column. In such situations, it is a waste of system resources to load all of the column data into memory, when only a small portion of the data is required for processing the query.

Figure 1:
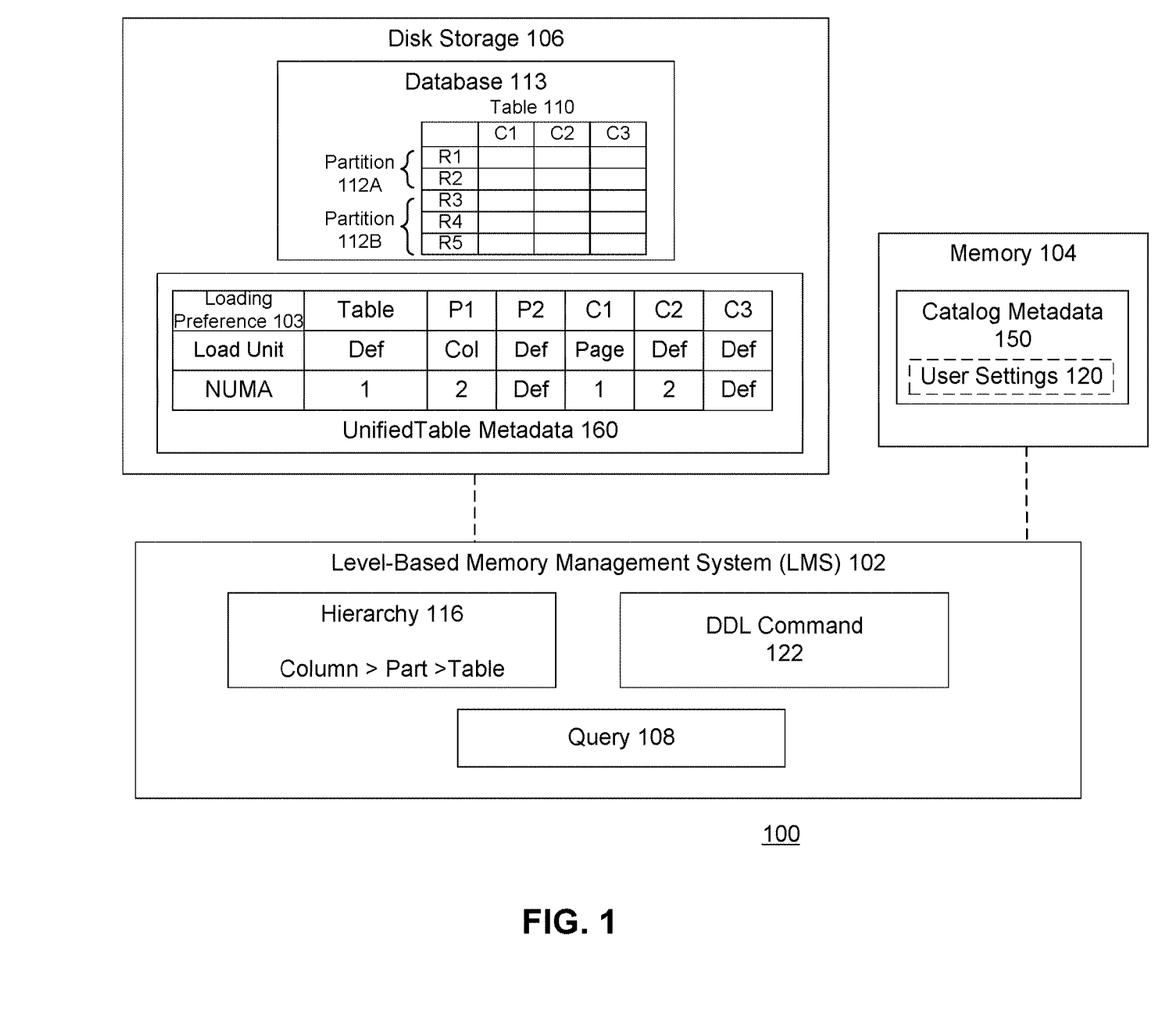
FIG. 1 is a block diagram illustrating example functionality for providing a hierarchical metadata enhancements for a memory management system, according to some embodiments.

FIG. 1 is a block diagram 100 illustrating example functionality for providing hierarchical metadata enhancements for a memory management system, according to some embodiments. A level-based memory management system (LMS) 102 may provide a hierarchical memory management system, in which a user or system may specify how data should be loaded into memory 104 from disk storage 106 at varying levels of granularity. In an embodiment, LMS 102 may store these loading preferences as metadata (e.g., UnifiedTable metadata 160 and/or catalog metadata 150) and the metadata may be used to determine which data to load from disk storage 106 into memory 104.

Example load techniques (for determining how much data to load into memory 104 from disk storage 106) may include page based and column based loading. Column based loading may require that all of the data from a particular column is loaded into and unloaded from memory as a single unit. Page based loading, by contrast, may allow smaller portions of the column data to be loaded into and evicted from memory 104.

While paged-based loading may provide for better memory utilization by loading smaller portions of relevant or accessed data (e.g., loading in smaller units of memory or data pages), loading full column data (e.g., which can extend across multiple memory pages) is often quicker however it also requires additional memory for the additional data that is being loaded. There is no single data loading and unloading technique (e.g., page or column load) that is best for all of the data needs of a particular database system. Because for the same data, the better or more resource efficient technique may vary over time and may depend on data changes and usage.

Database 113 may be configured or operable to employ either page-based loading or column-based loading. A column-level designation may enable a system or user (such as database administrator) to specify loading preferences on a column-by-column basis. The preferences may indicate whether the data of that particular column is to be loaded into memory using page load or column load.

While column-level designations are beneficial when compared to requiring the same load technique for all the tables of a database 113, there are other leveled designations that may provide administrators with greater flexibility or granularity with regard to how to load/unload data to/from memory 104.

Example designations include both partition-level and table-level designations. LMS 102 enables a user or system to further fine tune the loading of data from table 110 into memory by enabling partition-level and table-level preferences or designations for a table 110, in addition to providing for column-level preferences. Using the specified multi-level loading preferences, database 113 or LMS 102 may move data (e.g., load and unload) between disk storage 106 and memory 104 to increase system throughput and increase resource utilization.

Table 110 may be a column-oriented table of an in-memory database system 113. While database 113 may include any number of tables, each with any numbers of rows and columns, including columns, rows, and/or tables numbering into the millions or billions; for simplicity only a single table 110 with three columns (C1-C3) and five rows (R1-R5) is illustrated.

In an embodiment, table 110 may include or be divided into multiple partitions 112A-B. In a column-oriented database, partitions 112A, B may include horizontal divisions of the table 110, each including a subset of the rows across all of the columns. For example, partition 112A may include the data from rows R1, R2, and partition 112B may include the data from R3, R4, and R5.

For simplicity, only two partitions 112A, B are illustrated, however table 110 may be divided into any number of partitions of varying sizes. Each partition 112A, B may be logically be treated as its own individual sub-table, with its own partition load properties which may be specified.

In an embodiment, LMS 102 may store the metadata (including the multi-leveled preferences) of database 113, across two different locations, which are referred to as catalog metadata 150 and UnifiedTable metadata 160. In an embodiment, catalog metadata 150 may be stored and/or maintained in memory 104, while UnifiedTable metadata 160 is stored and/or maintained in disk storage 106. In an embodiment, UnifiedTable metadata 160 may be loaded from disk storage 106 into memory 104, and catalog metadata 150 may be separately persisted to disk storage 06 from memory 104.

Figure 5:
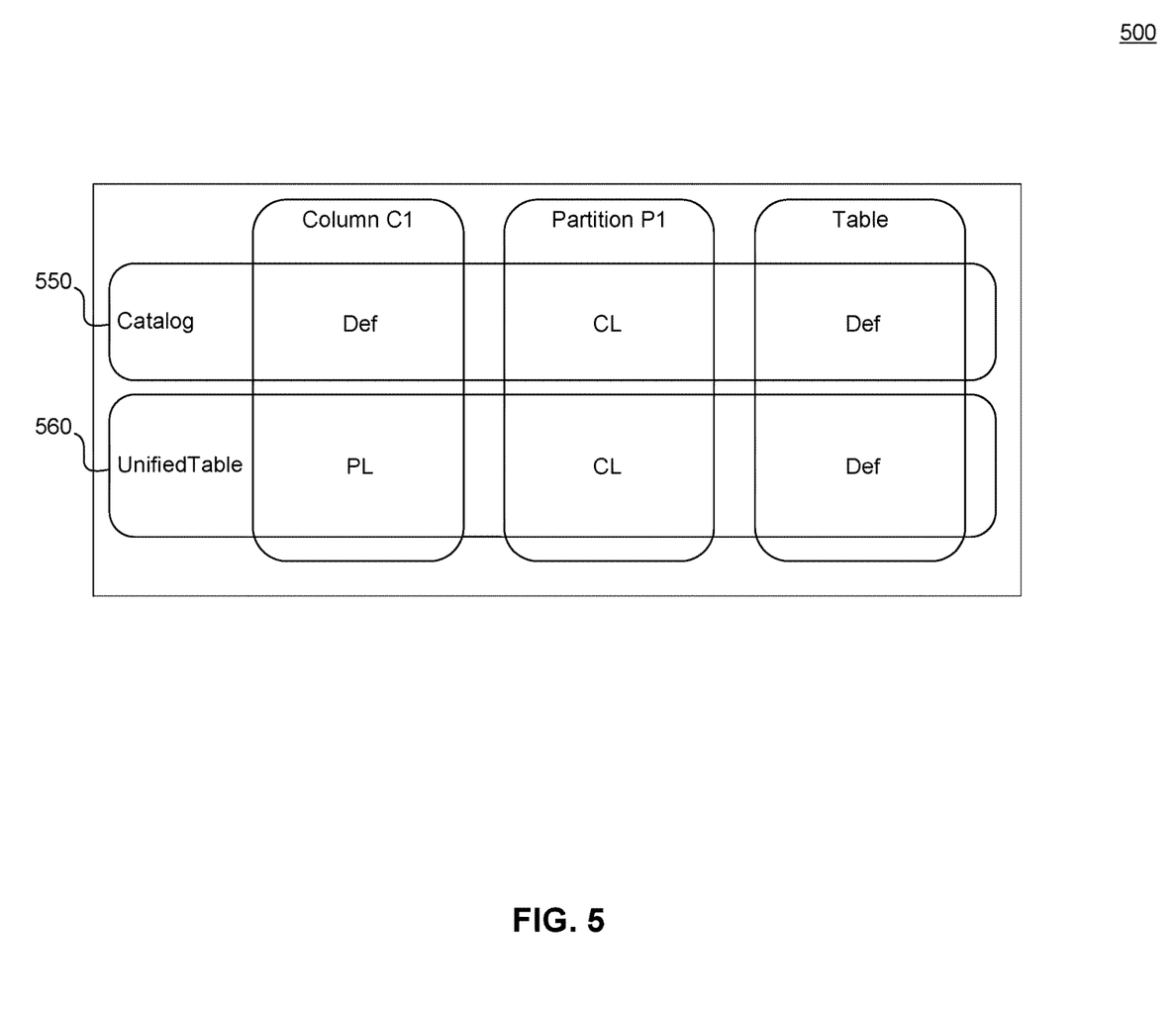
FIG. 5 is a block diagram illustrating a metadata arrangement for providing a level-based memory management system, according to some embodiments.

FIG. 5 is a block diagram 500 illustrating a metadata arrangement for providing a level-based memory management system (LMS), according to some embodiments. FIG. 5 illustrates an example of how catalog metadata 150 and UnifiedTable metadata 160 may be organized by LMS 102 for a particular table 110.

In an embodiment, the metadata of database 113 may be stored across two different locations, portions, or sections. These may include catalog metadata 550 and UnifiedTable metadata 560, which may correspond to catalog metadata 150 and UnifiedTable metadata 160, of FIG. 1, respectively. Catalog metadata 550 may include metadata (e.g., multi-level preferences) that is stored in memory 104, and used to perform query processing and/or receive metadata updates from a user.

UnifiedTable metadata 560 may include a persisted copy of catalog metadata 550, stored in a container, along with additional metadata or settings pertaining to data the table 110. In an embodiment, there may be periods of time when the UnifiedTable metadata 560 across the various levels (e.g., column, partition, and table) may not exactly match the metadata of the catalog 550. For example, a user may update the metadata preferences (which may be stored in catalog 550) but have not yet been persisted to UnifiedTable 560.

In an embodiment, there may be a variance in the relative sizes of catalog metadata 550 and UnifiedTable metadata 560, such the catalog metadata 550 is small enough to be stored in memory 104 without hindering system performance in loading data used to process queries 108, while UnifiedTable metadata 560 may be much larger. In an embodiment, UnifiedTable metadata 560 may include a container with information, including, but not limited to the multi-level preferences.

The example metadata illustrated in FIG. 5 may be a partial example for a table that includes a partition P1 and a column C1. For each of the table-level, partition-level, and column-level, there may be values in both catalog metadata 550 and UnifiedTable metadata 560.

The values marked "CL" correspond to a column-load designation. The values marked "PL" correspond to a page-load designation. The values marked "Def" may represent a default loading (where no specific user or system setting has been received or set) which may be either column-load or page-load, depending on what the system default is set to.

Returning to FIG. 1, UnifiedTable metadata 150 may include the loading preferences 103 specified by a user or system for table 110 of database system 113. The loading preferences 103 illustrated in UnifiedTable metadata 160 may include system or user-defined settings for the columns Table (i.e., table 110), P1 (i.e., partition 112A), P2 (i.e., partition 112B), C1, C2, and C3 (i.e., corresponding to the columns C1-C3). The table column includes values for the table-level loading preferences (which corresponds to unloading as well). The table-level loading preferences enable a user to specify how the data across all of the columns of table 110 should be loaded.

In an embodiment, loading preferences 103 may include two separately defined values for teach table, partition, and column: a "Load Unit" value, and a NUMA (non-uniform memory access) value. NUMA will be discussed in greater detail below.

Load unit preferences may allow a user to specify whether the user wants to use page loading or column loading when loading data from storage 106 to memory 104. And, as illustrated, this may be set at varying levels of granularity (table, partition, column). Or, if the user has not set a particular preference, the value "Def" for default may be set in loading preferences 103. In an embodiment, default may be interpreted by LMS 102 as being column loadable which may be set to the database 113 default. However, in other embodiments, the database 113 default may be set to page loadable.

In the example illustrated, a user may not have specified a preference for the table, P2, C2, or C3 load unit settings. However, the user may have specified load unit preferences for partitions partition P1 and column C1.

In an embodiment, LMS 102 may include a hierarchy 116 that indicates how the load unit (and NUMA) values or settings are to be interpreted for data loading across both catalog metadata 150 and UnifiedTable metadata 160, particularly in the case of conflict. For example, if a table is set to page loadable, and a column of the table is set to column-loadable, when data of the column is loaded into memory 104, database 113 and/or LMS 102 may need to determine whether to load the data of the column using page load or column load.

In the example hierarchy 116, partition preferences may be given priority over table preferences in case of a loading preference conflict. For example, loading preferences 103 indicate that table has a load unit preference of default which is interpreted as column load. However, partition 2 indicates a page loading preference. As illustrated from table 110, partition 2 (e.g., partition 112B) is a part of the table 110. This conflict is resolved based on hierarchy 116 by making partition 112B (P2) page loadable.

Hierarchy 116 further indicates that column preferences may take priority over partition preferences in case of a loading preference conflict. Hierarchy 116 is one example technique for evaluating and resolving conflicts between loading preferences 103, in which the smallest granularity level is provided the highest priority. In other embodiments, other priority or weighing of the varying level values may be used in a hierarchy 116 to resolve conflicts.

Figure 2:
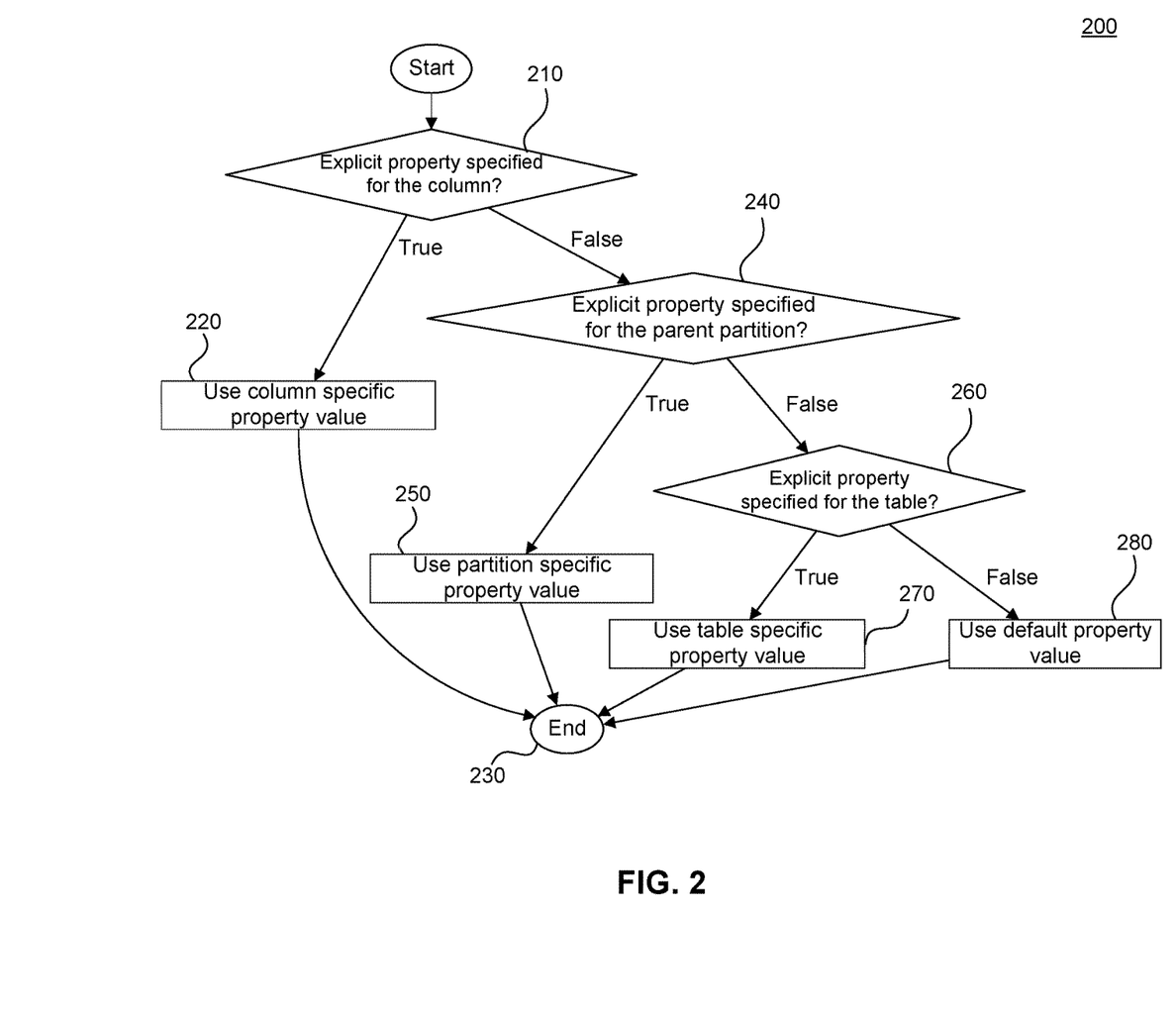
FIG. 2 is a flowchart illustrating example operations for providing hierarchical metadata enhancements for a memory management system, according to some embodiments.

FIG. 2 is a flowchart 200 illustrating example operations for providing hierarchical metadata enhancements for a metadata based memory management system, according to some embodiments. The flowchart 200 illustrates an example of how database 113 or LMS 102 may evaluate loading preferences 103 based on hierarchy 116.

In an embodiment, query 108 may be received in which data from column C1 needs to be loaded into memory 104. LMS 102 may begin by evaluating the loading preferences 103 for column C1 of table 110. At 210, LMS 102 may determine whether there is an explicit property defined for C1 in loading preferences 103. Since, the value of C1 is set to page, at 220 database 13 may load the required data from column C1 from disk storage 106 into memory 104 using a page loading technique. The processing may then complete at 230 without further processing.

If, however, no property has been set for a column, such as for C2 and C3, then LMS 102 may continue processing at 240 and check if the parent partition for the column has a property value defined or set. If table 110 is partitioned, and the desired value(s) is in partition P1, then according to loading preferences 103, column load is set. At 250, column load may then be used to load the values of the column within partition P1, and processing completes at 230.

If however, the table 110 has not been partitioned, or a specific partition value has not been defined by a user (such as P2 which is set to default), processing would continue to 260 and the table value would be checked. If table value included either a column or page load value, then at 270 the set table preference value would be used.

However, as illustrated in loading preferences 103, table also includes a default value. As such, at 280, database 113 would use whatever default value has been set (e.g., column load). Thus column load would ultimately be applied to C2 and C3 of P2 as well. However, C1 of P2 would be page loadable.

Returning to FIG. 1, a user may specify a DDL (data definition language) command 122 to set the values of loading preferences 103. DDL may refer to a language that is used to define data structures such as database schemas, tables, indexes, and users. In an embodiment, DDL command 122 may take the form of an SQL (structured query language) statement. Two DDL commands would may be used to set loading preferences 103 may include a Create table or Alter table command Example DDL commands 122 for altering the load preferences 103 for an already created table 110 is illustrated below:

ALTER TABLE 110 DEFAULT LOADABLE
ALTER TABLE 110 ALTER PARTITION P1 COLUMN LOADABLE
ALTER TABLE 110 ALTER (C1 ALTER PAGE LOADABLE)

In the examples above, table 110 may be set to a default loadable value, partition P1 may be set to column load, and column C1 may be set to page load.

In an embodiment, a user may specify whether the changes are to be implemented immediately or deferred. In the case of an immediate update, the DDL command 122 may make the required changes to the column data (e.g., moving it between disk storage 106 and memory 104) based on the updated property values, and both UnifiedTable metadata 160 may be updated. In the case of a deferred update, the DDL command 122 may only update metadata values, and catalog metadata 150 may be updated. Then, for example, the data may be moved (in memory 104) at some future point like during a system reboot, delta merge, or column load operation.

As illustrated in FIG. 1, disk storage 106 may include UnifiedTable metadata 160 including loading preferences 103, and memory 104 may include RT (run-time) metadata 118 including user settings 120. In an embodiment, when a user updates the loading preferences 103, the updated preferences may be stored as user settings 120 in catalog metadata 150 in memory. As part of an SQL (structured query language) statement (e.g., DDL or DML command) both the catalog metadata 150 and UnifiedTable metadata 160 may be updated and persisted to disk storage 106.

User settings 120 may include a similar table structure to what is illustrated as loading preferences 103, but for only those updated or received settings 120 since the previous write to UnifiedTable metadata 160. The user settings 120 may then be flushed to disk storage 106 into storage metadata at occasional save-points. The changes to loading preferences 103, as received from a user, may be logged in case of failure and the LMS 102 may support rollbacks in case of failure.

In an embodiment, LMS 102 may receive query 108. Query 108 may include a database query on a portion of data from table 110. The movement of data as described herein may be used to improve processing resource utilization with regard to query 108 processing. In an embodiment, when new loading preferences 103 are received as user settings 120. Database 113 may use the user settings 120 to process the query 108, the data of table 110 may be loaded accordingly.

Then, for example, on a next system restart or boot operation, the data may be loaded into memory 104 in accordance to any saved or stored loading preferences 103 in the stored metadata (e.g., UnifiedTable metadata 160). While LMS 102 and database 113 are illustrated as being separate devices in the example of FIG. 1, in another embodiment, LMS 102 may be integrated into or work correspondent with database 113.

As illustrated in FIG. 1, loading preferences 103 may also include a NUMA value for the various levels as well. NUMA is another optional data storage preference that may be set by a user, that may be used and processed in a similar manner as described above with respect to load unit according to hierarchy 116. For example, NUMA settings may also be stored in catalog metadata 150 and in UnifiedTable metadata 160. For simplicity, both NUMA and data load settings are illustrated in the same data structure, however, in other embodiments, NUMA settings may be stored separately from data load settings.

NUMA settings may help smooth out uneven data distributions or table distributions on distributed database systems with multiple data nodes. In an embodiment, NUMA settings may enable a user to assign database objects to particular data nodes, which may over time, minimize data movement.

In an embodiment, the NUMA location preference may also be set using a DDL or DML (data manipulation language) command 122 in the form of a SQL command. For example, NUMA NODE ('2') may set a particular NUMA node setting to the second device, or device named node 2. As illustrated in loading preferences 103, there may be two devices in the system: device 1 and device 2. The default option may be to maintain the data on whatever device it is currently located, or may be set to a particular device (e.g., device 1). In other embodiments, any number of devices may be used. And the device list may be updated as new devices are brought online or old devices are taken offline.

In an embodiment, during a table or column load, LMS 102 may estimate the runtime data size of the table 110. An effective list of preferred NUMA locations may be derived, where each node in the list has free memory enough to store the table 110. In an embodiment, the node with the most amount of free memory may be used to store the table 110 as the NUMA location (in the default NUMA setting). In an embodiment, the NUMA setting may only be processed for those database objects (e.g., tables, partitions, columns) that are set to column load based on the load preferences 103 analysis.

Figure 3:
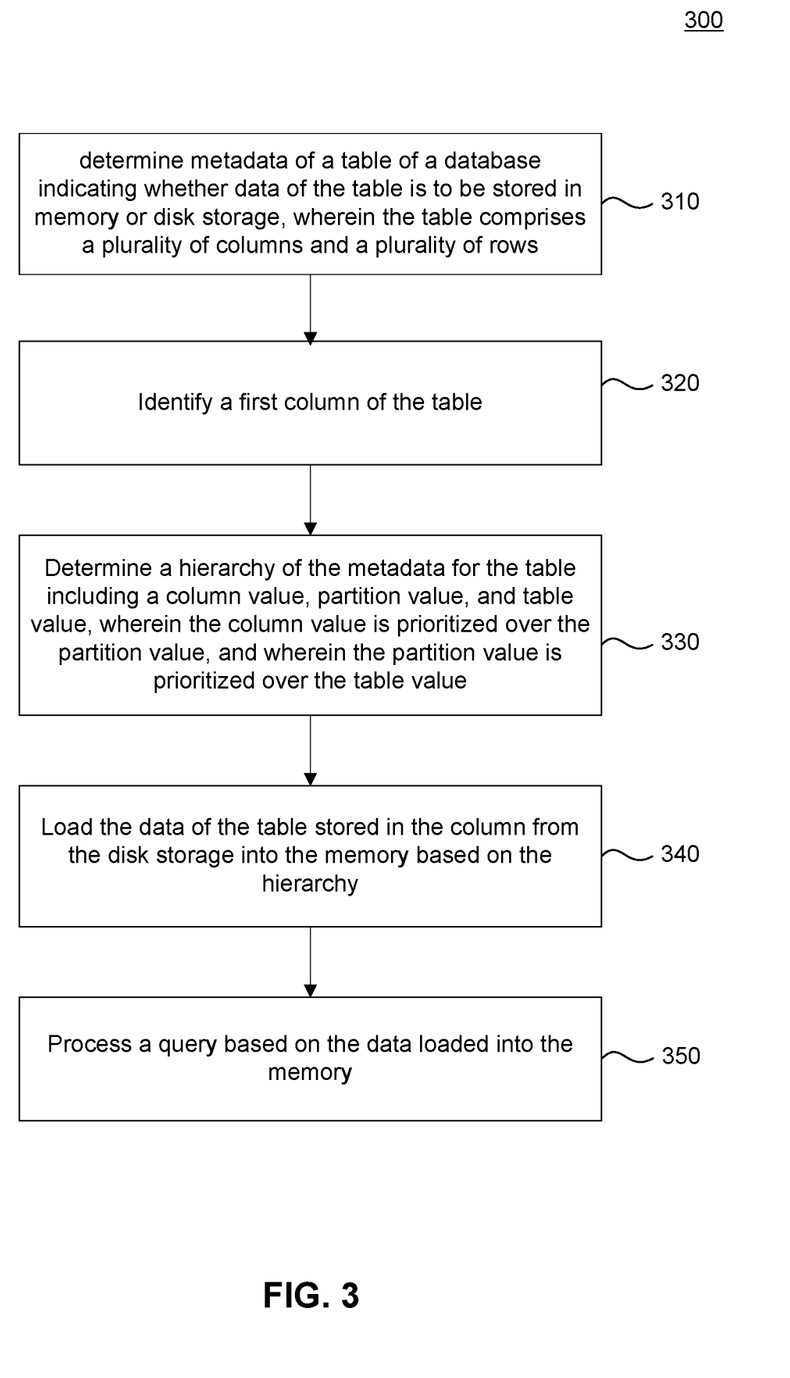
FIG. 3 is another flowchart illustrating example operations for providing hierarchical metadata enhancements for a memory management system, according to some embodiments.

FIG. 3 is another flowchart 300 illustrating example operations for providing hierarchical metadata enhancements for a level-based memory management system, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIG. 1.

In 310, it is determined that metadata of a table of a database indicates whether data of the table is to be stored in memory or disk storage, wherein the table comprises a plurality of columns and a plurality of rows. For example, database 113 may determine that table 110 includes columns C1-C3 and rows R1-R5 divided into two partitions 112A, 112B. When user updates to loading preferences 103 are received, they may be temporarily stored in catalog metadata 150 as user settings 120. Then, when the data is moved in accordance with the latest loading preferences 103, or at some other period of time, the data of UnifiedTable metadata 160 may be updated.

In 320, a first column of the table is identified. For example, LMS 102 or database 113 may identify that data from partition 112B of column 1 is to be processed as part of query 108.

In 330, a hierarchy of the metadata for the table including a column value, partition value, and table value is determined, wherein the column value is prioritized over the partition value, and wherein the partition value is prioritized over the table value. For example, if the data has not already been moved in accordance with loading preferences 103, database 113 or LMS 102 may compare the loading preferences 103 against hierarchy 116 to determine which data to move from disk storage 106 into memory 104 for query processing. This procedure is described above in FIG. 2. From loading preferences 103, it may be determined that column 1 is page loaded.

In 340, the data of the table stored in the column is loaded from the disk storage into the memory based on the hierarchy. For example, database 113 may load one or more pages of data of column 1 from disk storage 106 into memory 104 based on hierarchy 116. When the data of the column is later evicted from memory 104, the data may also be evicted on the same column-level or page-level basis.

In 350, a query is processed based on the data loaded into the memory. For example, the database 113 or LMS 102 may then process query 108 with the data that has been moved into or that was otherwise stored in memory 104 in accordance with load preferences 103.

Figure 4:
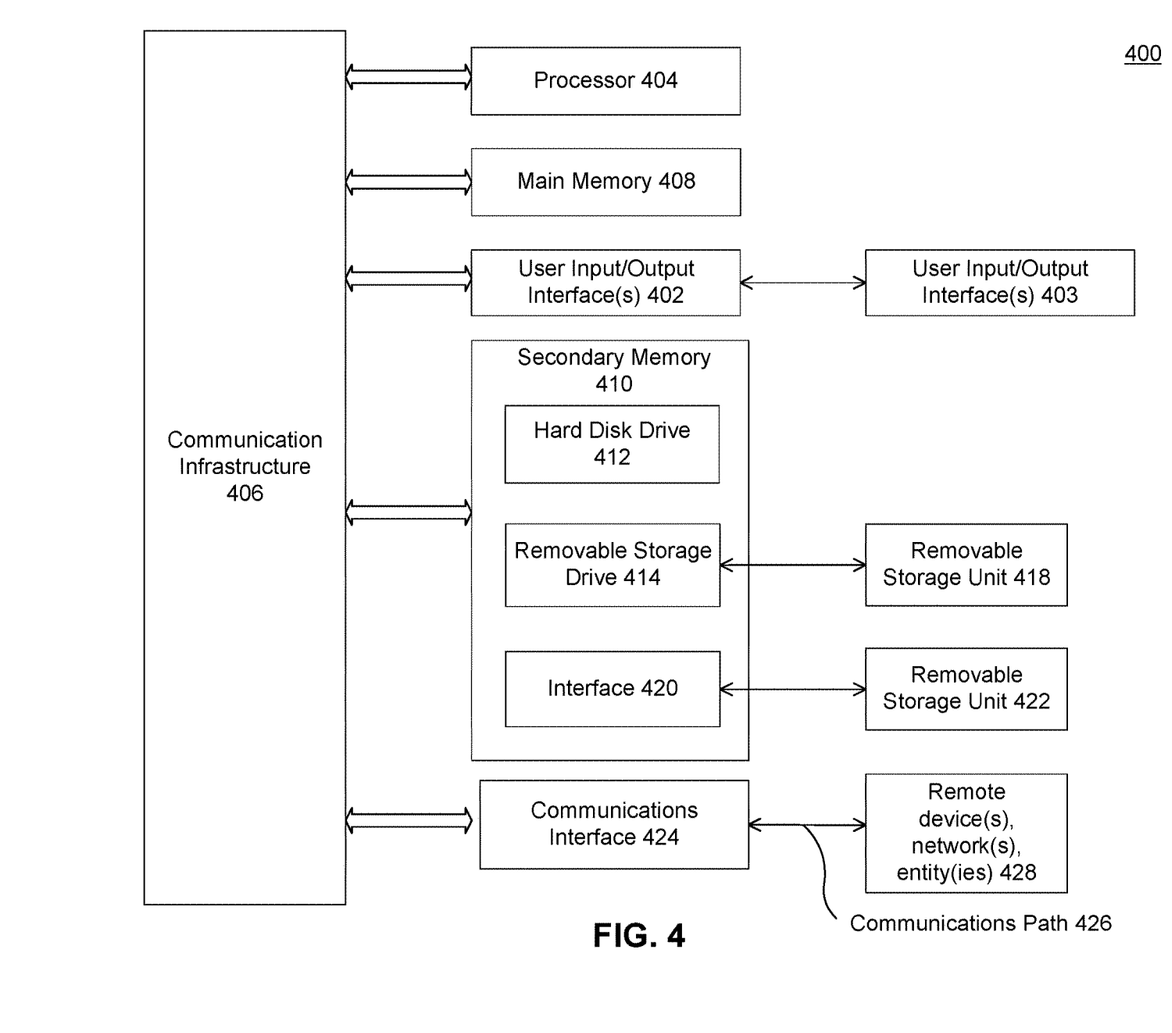
FIG. 4 is example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include customer input/output device(s) 403, such as monitors, keyboards, pointing devices, etc., which may communicate with communication infrastructure 406 through customer input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:
1. A method comprising:
 determining metadata of a table of a database indicating whether data of the table is to be loaded into memory from disk storage using either column load or page load, wherein the table comprises a plurality of columns and a plurality of rows;
 identifying a first column of the table;
 determining a conflict between metadata of the first column and metadata of the table, wherein the metadata of the first column indicates either the column load or the page load, and the metadata of the table indicates either the column load or the page load different from the metadata of the first column;
 determining a hierarchy for resolving the conflict, wherein the metadata of the first column is prioritized over the metadata of the table;
 resolving the conflict based on the hierarchy;
 loading the data of the table stored in the column from the disk storage into the memory based on the metadata of the first column as indicated based on the resolving; and
 processing a query based on the data loaded into the memory.

2. The method of claim 1, wherein the table is divided into two or more partitions.

3. The method of claim 2, wherein the loading is based on the partition value corresponding to a particular one of the partitions, wherein the partition value is different from the table value.

4. The method of claim 2, wherein the partition value for a first one of the two or more partitions is different from a partition value for a second one of the two or more partitions, and wherein the data of the table stored in the column spans both the first partition and the second partition.

5. The method of claim 2, wherein first partition of the two or more partitions is associated with metadata different from either the metadata of the column or the metadata of the table.

6. The method of claim 1, wherein the loading is based on the column value corresponding to the first column, wherein the column value is different from the table value.

7. The method of claim 6, wherein the metadata comprises non-uniform memory access (NUMA) values that indicates a particular node on which to store the data of the table of the column.

8. The method of claim 1, wherein the metadata comprises a column load value that indicates all of the data of a particular column, partition, or table is moved from the disk storage into memory.

9. The method of claim 7, wherein the metadata comprises a page load value that indicates only a portion of the data of a particular column, partition, or table is moved from the disk storage into memory.

10. A system comprising:
a memory; and
at least one processor coupled to the memory and configured to perform operations comprising:
   determining metadata of a table of a database indicating whether data of the table is to be loaded into memory from disk storage using either column load or page load, wherein the table comprises a plurality of columns and a plurality of rows;
   identifying a first column of the table;
   determining a conflict between metadata of the first column and metadata of the table, wherein the metadata of the first column indicates either the column load or the page load, and the metadata of the table indicates either the column load or the page load different from the metadata of the first column;
   determining a hierarchy for resolving the conflict, wherein the metadata of the first column is prioritized over the metadata of the table;
   resolving the conflict based on the hierarchy;
   loading the data of the table stored in the column from the disk storage into the memory based on the metadata of the first column as indicated based on the resolving; and
   processing a query based on the data loaded into the memory.

11. The system of claim 10, wherein the table is divided into two or more partitions.

12. The system of claim 11, wherein the loading is based on the partition value corresponding to a particular one of the partitions, wherein the partition value is different from the table value.

13. The system of claim 11, wherein the partition value for a first one of the two or more partitions is different from a partition value for a second one of the two or more partitions, and wherein the data of the table stored in the column spans both the first partition and the second partition.

14. The system of claim 10, wherein the loading is based on the column value corresponding to the first column, wherein the column value is different from the table value.

15. The system of claim 14, wherein the metadata comprises non-uniform memory access (NUMA) values that indicates a particular node on which to store the data of the table of the column.

16. The system of claim 10, wherein the metadata comprises a column load value that indicates all of the data of a particular column, partition, or table is moved from the disk storage into memory.

17. The system of claim 16, wherein the metadata comprises a page load value that indicates only a portion of the data of a particular column, partition, or table is moved from the disk storage into memory.

18. A non-transitory computer-readable device having instructions stored thereon that, when executed by at least one computing device, cause the at least one computing device to perform operations comprising:
   determining metadata of a table of a database indicating whether data of the table is to be loaded into memory from disk storage using either column load or page load, wherein the table comprises a plurality of columns and a plurality of rows;
   identifying a first column of the table;
   determining a conflict between metadata of the first column and metadata of the table, wherein the metadata of the first column indicates either the column load or the page load, and the metadata of the table indicates either the column load or the page load different from the metadata of the first column;
   determining a hierarchy for resolving the conflict, wherein the metadata of the first column is prioritized over the metadata of the table;
   resolving the conflict based on the hierarchy;
   loading the data of the table stored in the column from the disk storage into the memory based on the metadata of the first column as indicated based on the resolving; and
   processing a query based on the data loaded into the memory.

19. The device of claim 18, wherein the table is divided into two or more partitions.

20. The device of claim 19, wherein the loading is based on the partition value corresponding to a particular one of the partitions, wherein the partition value is different from the table value.

* * * * *